United States Patent
Zhang (10) Patent No.: US 9,585,213 B2
(45) Date of Patent: Feb. 28, 2017

(54) LIGHT SOURCE DRIVING CIRCUIT AND METHOD

(71) Applicant: SHENZHEN CHINA STAR OPTOELECTRONICS TECHNOLOGY CO., LTD., Shenzhen, Guangdong (CN)

(72) Inventor: Xianming Zhang, Guangdong (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 207 days.

(21) Appl. No.: 14/408,119

(22) PCT Filed: Sep. 16, 2014

(86) PCT No.: PCT/CN2014/086640
§ 371 (c)(1),
(2) Date: Dec. 15, 2014

(87) PCT Pub. No.: WO2016/033828
PCT Pub. Date: Mar. 10, 2016

(65) Prior Publication Data
US 2016/0278175 A1 Sep. 22, 2016

(30) Foreign Application Priority Data
Sep. 2, 2014 (CN) .......................... 2014 1 0441832

(51) Int. Cl.
*H05B 33/08* (2006.01)
*H05B 37/02* (2006.01)

(52) U.S. Cl.
CPC ..... *H05B 33/0824* (2013.01); *H05B 33/0842* (2013.01); *H05B 37/02* (2013.01)

(58) Field of Classification Search
USPC ............. 315/247, 224, 307–326, 185 S, 291, 315/209 R
See application file for complete search history.

(56) References Cited

U.S. PATENT DOCUMENTS 8,421,365 B2* 4/2013 Kong ................. H05B 33/0818
315/209 R
2008/0088254 A1* 4/2008 Yang ................. H05B 33/0815
315/247

FOREIGN PATENT DOCUMENTS

CN 101187754 A 5/2008
CN 103974513 8/2014

* cited by examiner

*Primary Examiner* — Tuyet Vo
(74) *Attorney, Agent, or Firm* — Ladas & Parry LLP (57) ABSTRACT

The present invention provides a light source driving circuit and method. The light source driving circuit is used to provide light source driving signals to a light source. The light source driving circuit comprises a light source driving chip, a first pulse width modulation (PWM) signal input terminal, and a first control circuit. The light source driving chip is utilized for generating and outputting the light source driving signals. The first PWM signal input terminal is utilized for receiving a first PWM signal. The first control circuit is utilized for controlling the light source to emit light rays according to the first PWM signal.

12 Claims, 9 Drawing Sheets

LIGHT SOURCE DRIVING CIRCUIT AND METHOD

BACKGROUND OF THE INVENTION

1. Field of the Invention

The present invention relates to a light source driving technology, and more particularly, to a light source driving circuit and method.

2. Description of Prior Art

In general, a traditional technique for driving a light source (e.g., a backlight source of a display panel) is described below.

A LED (Light Emitting Diode) driving chip receives a PWM (Pulse Width Modulation) signal, generates a control signal according to the PWM signal, and control a LED light bar by way of the control signal.

In practice, the inventor(s) found that there exists the following problems in the existing technical skills.

Taking eight LED lights included in a LED light bar for example, implementing the afore-described technical scheme generally needs eight PWM signal receiving terminals and eight control signal output terminals in a LED driving chip. However, the more the LED lights are, the more pins the LED driving chip is required. Alternatively, more LED driving chips are required to match corresponding LED lights. This increases the cost extremely.

The afore-described technical scheme does not adapt to some application environments with complicated electronic components.

Therefore, there is a need to provide a new technical scheme for solving above technical problems.

SUMMARY OF THE INVENTION

The objective of the present invention is to provide a light source driving circuit and method capable of adapting to an application environment with complicated electronic components.

To solve above problems, the technical schemes of the present invention are provided below.

A light source driving circuit for providing light source driving signals to a light source is provided. The light source comprises at least one light emitting element. Said light source driving circuit comprises: a light source driving chip for generating the light source driving signals and outputting the light source driving signals to the light source; at least one first pulse width modulation (PWM) signal input terminal for receiving at least one first PWM signal; and a first control circuit connected to the light source, the light source driving chip, and the first PWM signal input terminal, for receiving the first PWM signal from the first PWM signal input terminal and controlling the light source to emit light rays according to the first PWM signal; wherein the light source driving chip is utilized to output the light source driving signals to the light source via the first control circuit; and wherein the light source driving chip is further utilized to receive current detection signals related to the light source and generate the light source driving signals according to the current detection signals, where the current detection signals are signals related to a current passing the light source; the light source driving chip comprising: at least one current detection signal input terminal connected to the light source, for receiving the current detection signals; a main chip for generating the light source driving signals according to the current detection signals; and at least one light source driving signal output terminal connected to the first control circuit, for outputting the light source driving signals.

In the light source driving circuit, the first control circuit comprises at least one first field-effect transistor, which comprises: a first control terminal connected to the first PWM signal input terminal, for receiving the first PWM signal and controlling a first current channel between a first input terminal and a first output terminal to be turned on or turned off according to the first PWM signal; the first input terminal connected to the light source driving signal output terminal, for receiving the light source driving signals; and the first output terminal connected to the light emitting element and the current detection signal input terminal, for outputting the light source driving signals when the first current channel is turned on.

In the light source driving circuit, the light source driving chip further comprises: a second PWM signal input terminal for receiving a second PWM signal; and at least one control signal output terminal for outputting at least one control signal, wherein the control signal corresponds to the second PWM signal; the main chip being further utilized to generate the control signal according to the second PWM signal; the light source driving circuit further comprising: a second control circuit connected to the light source driving chip, the first control circuit and the light source, for controlling the light source to emit light rays according to the control signal; wherein the first control circuit is connected to the light source via the second control circuit.

A light source driving circuit for providing light source driving signals to a light source is provided. The light source comprises at least one light emitting element. Said light source driving circuit comprises: a light source driving chip for generating the light source driving signals and outputting the light source driving signals to the light source; at least one first pulse width modulation (PWM) signal input terminal for receiving at least one first PWM signal; and a first control circuit connected to the light source, the light source driving chip, and the first PWM signal input terminal, for receiving the first PWM signal from the first PWM signal input terminal and controlling the light source to emit light rays according to the first PWM signal; wherein the light source driving chip is utilized to output the light source driving signals to the light source via the first control circuit.

In the light source driving circuit, the light source driving chip is further utilized to receive current detection signals related to the light source and generate the light source driving signals according to the current detection signals, where the current detection signals are signals related to a current passing the light source.

In the light source driving circuit, wherein the light source driving chip comprises: at least one current detection signal input terminal connected to the light source, for receiving the current detection signals; a main chip for generating the light source driving signals according to the current detection signals; and at least one light source driving signal output terminal connected to the first control circuit, for outputting the light source driving signals.

In the light source driving circuit, the first control circuit comprises at least one first field-effect transistor, which comprises: a first control terminal connected to the first PWM signal input terminal, for receiving the first PWM signal and controlling a first current channel between a first input terminal and a first output terminal to be turned on or turned off according to the first PWM signal; the first input terminal connected to the light source driving signal output terminal, for receiving the light source driving signals; and the first output terminal connected to the light emitting element and the current detection signal input terminal, for outputting the light source driving signals when the first current channel is turned on.

In the light source driving circuit, the light source driving chip further comprises: a second PWM signal input terminal for receiving a second PWM signal; and at least one control signal output terminal for outputting at least one control signal, in which the control signal corresponds to the second PWM signal; the main chip being further utilized to generate the control signal according to the second PWM signal; the light source driving circuit further comprising: a second control circuit connected to the light source driving chip, the first control circuit, and the light source, for controlling the light source to emit light rays according to the control signal; wherein the first control circuit is connected to the light source via the second control circuit.

In the light source driving circuit, the second control circuit comprises at least one second field-effect transistor, which comprises: a second control terminal connected to the control signal output terminal, for receiving the control signal and controlling a second current channel between a second input terminal and a second output terminal to be turned on or turned off according to the control signal; the second input terminal connected to the first output terminal, for receiving the light source driving signals from the first output terminal; and the second output terminal connected to the light emitting element and the current detection signal input terminal, for outputting the light source driving signals to the light emitting element when the second current channel is turned on; the first control circuit being further utilized to output the light source driving signals to the light source via the second control circuit when the second current channel is turned on.

In the light source driving circuit, the light source driving chip comprises a first predetermined number of the current detection signal input terminals and the first predetermined number of the light source driving signal output terminals.

In the light source driving circuit, the light source driving circuit is connected to a PWM signal generating circuit; and the light source driving chip comprises a second predetermined number of the second PWM signal input terminals and the first predetermined number of the control signal output terminals, and the second predetermined number of the second PWM signal input terminals are arbitrarily connected to the second predetermined number of PWM signal output terminals of the PWM signal generating circuit.

In the light source driving circuit, the main chip is further utilized to receive the second predetermined number of the second PWM signals via a receiving terminal and generate the first predetermined number of the control signals according to the second predetermined number of the second PWM signals.

In the light source driving circuit, the first predetermined number is eight and the second predetermined number is one.

A light source driving method comprises steps of: utilizing a light source driving chip for generating light source driving signals and outputting the light source driving signals to a light source; utilizing a first pulse width modulation (PWM) signal input terminal for receiving at least one first PWM signal; and utilizing a first control circuit for receiving the first PWM signal from the first PWM signal input terminal and controlling the light source to emit light rays according to the first PWM signal.

In the light source driving method, the step of generating the light source driving signals by utilizing the light source driving chip comprises: utilizing the light source driving chip to receive current detection signals related to the light source and generate the light source driving signals according to the current detection signals, where the current detection signals are signals related to a current passing the light source.

In the light source driving method, the step of generating the light source driving signals by utilizing the light source driving chip and outputting the light source driving signals to the light source comprises: utilizing a current detection signal input terminal of the light source driving chip to receive the current detection signals, in which the current detection signal input terminal is connected to the light source; utilizing a main chip of the light source driving chip to generate the light source driving signals according to the current detection signals; and utilizing a light source driving signal output terminal of the light source driving chip to output the light source driving signals, in which the light source driving signal output terminal is connected to the first control circuit.

In the light source driving method, the step of utilizing the first control circuit for receiving the first PWM signal from the first PWM signal input terminal and controlling the light source to emit light rays according to the first PWM signal comprises: utilizing a first control terminal of a first field-effect transistor of the first control circuit to receive the first PWM signal and control a first current channel between a first input terminal and a first output terminal to be turned on or turned off according to the first PWM signal, in which the first control terminal is connected to the first PWM signal input terminal; utilizing the first input terminal of the first field-effect transistor of the first control circuit to receive the light source driving signals, in which the first input terminal is connected to the light source driving signal output terminal; and utilizing the first output terminal of the first field-effect transistor of the first control circuit to output the light source driving signals when the first current channel is turned on, in which the first output terminal is connected to the light emitting element and the current detection signal input terminal.

In the light source driving method, said method further comprises steps of: utilizing a second PWM signal input terminal of the light source driving chip to receive a second PWM signal; utilizing the main chip of the light source driving chip to generate at least one control signal according to the second PWM signal; utilizing a control signal output terminal of the light source driving chip to output the control signal, in which the control signal corresponds to the second PWM signal; and utilizing a second control circuit of the light source driving circuit to control the light source to emit light rays according to the control signal, in which the second control circuit is connected to the light source driving chip, the first control circuit and the light source, and the first control circuit is connected to the light source via the second control circuit.

In the light source driving method, the step of utilizing the second control circuit of the light source driving circuit to control the light source to emit light rays according to the control signal comprises: utilizing a second control terminal of a second field-effect transistor of the second control circuit to receive the control signal and control a second current channel between a second input terminal and a second output terminal to be turned on or turned off according to the control signal, in which the second control terminal is connected to the control signal output terminal; utilizing the second input terminal of the second field-effect transistor of the second control circuit to receive the light source driving signals from the first output terminal, in which the second input terminal is connected to the first output terminal; utilizing the second output terminal of the second field-effect transistor of the second control circuit to output the light source driving signals to the light emitting element when the second current channel is turned on, in which the second output terminal is connected to the light emitting element and the current detection signal input terminal; and utilizing the first control circuit to output the light source driving signals to the light source via the second control circuit when the second current channel is turned on.

In the light source driving method, the step of utilizing the main chip of the light source driving chip to generate the at least one control signal according to the second PWM signal comprises: utilizing the main chip to receive a second predetermined number of the second PWM signals via a receiving terminal and generate a first predetermined number of the control signals according to the second predetermined number of the second PWM signals.

In contrast to conventional skills, the present invention can adapt to an application environment with complicated electronic components.

To make above content of the present invention more easily understood, it will be described in details by using preferred embodiments in conjunction with the appending drawings.

DETAILED DESCRIPTION OF THE PREFERRED EMBODIMENTS

The following descriptions for the respective embodiments are specific embodiments capable of being implemented for illustrations of the present invention with referring to appended figures.

Figure 1:
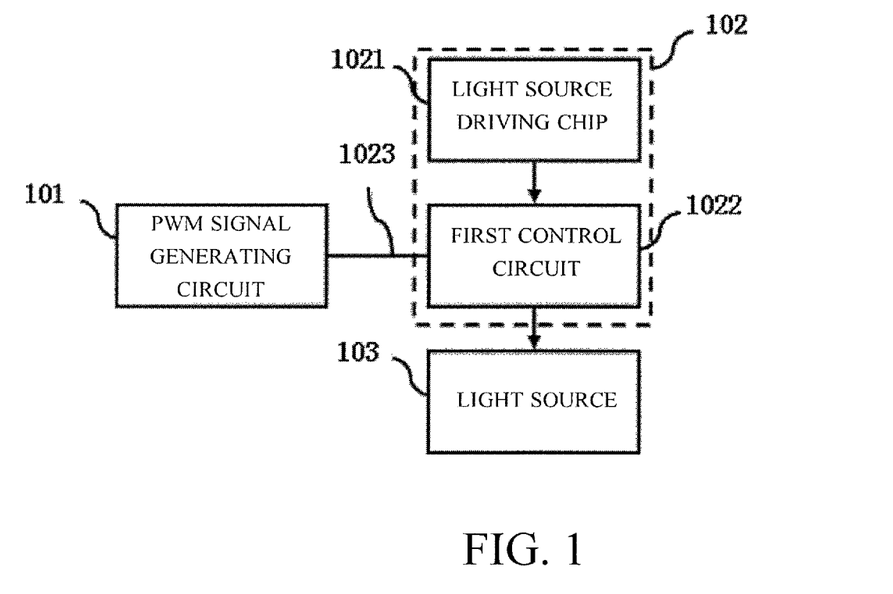
FIG. 1 is a schematic diagram showing a connection relation between a light source driving circuit, a light source, and a pulse width modulation (PWM) signal generating circuit in accordance with a first embodiment of the present invention.
Figure 2:
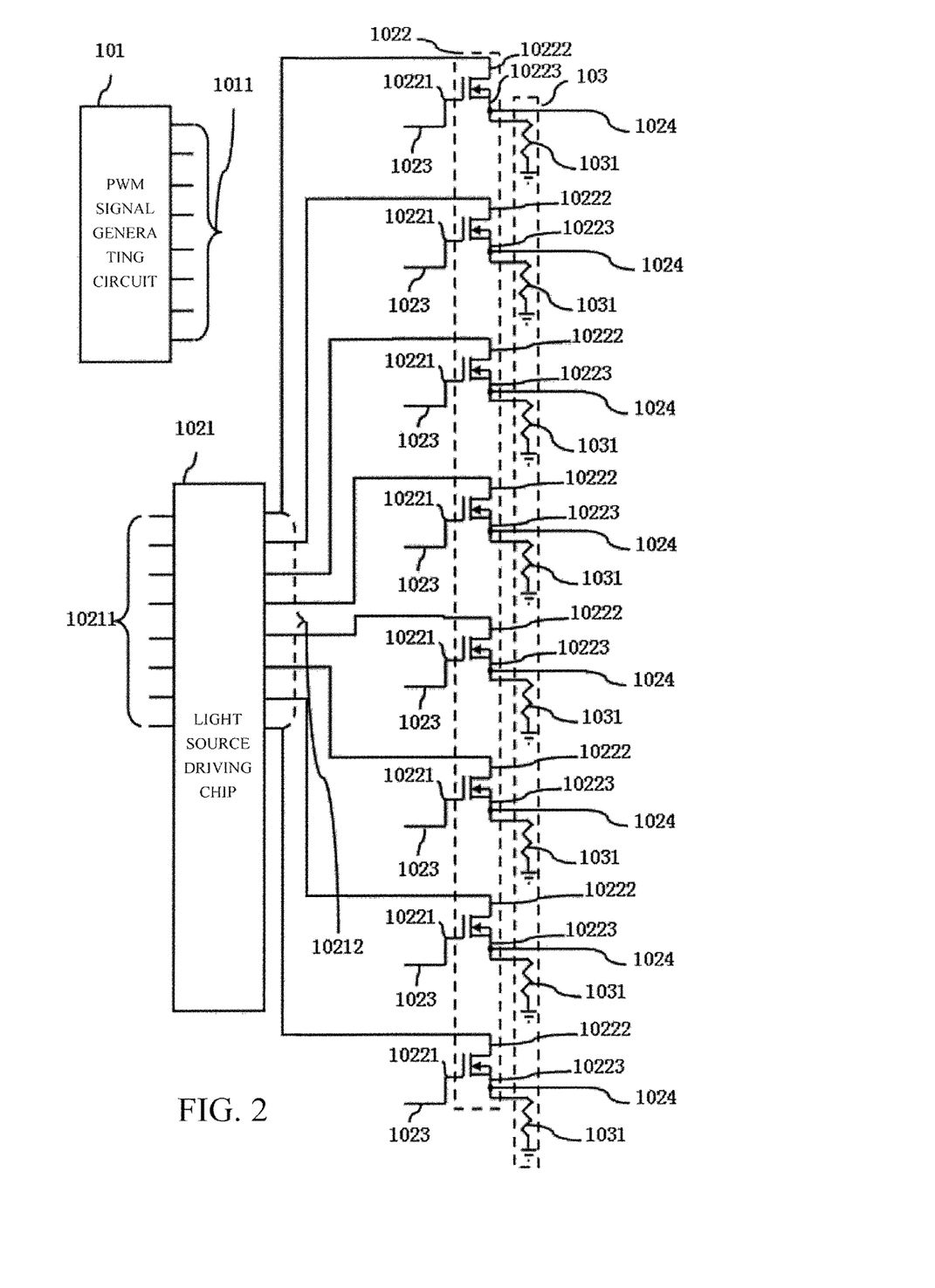
FIG. 2 is a schematic diagram showing a circuit indicating a connection relation between the light source driving circuit, the light source, and the PWM signal generating circuit shown in FIG. 1 in accordance with the first embodiment of the present invention.

Please refer to FIG. 1 and FIG. 2. FIG. 1 is a schematic diagram showing a connection relation between a light source driving circuit 102, a light source 103, and a pulse width modulation (PWM) signal generating circuit 101 in accordance with a first embodiment of the present invention. FIG. 2 is a schematic diagram showing a circuit indicating a connection relation between the light source driving circuit 102, the light source 103, and the PWM signal generating circuit 101 shown in FIG. 1 in accordance with the first embodiment of the present invention.

The light source driving circuit 102 of the present embodiment is utilized to provide light source driving signals to the light source 103. The light source 103 may comprise at least one light emitting element 103. The light source 103 can be, for example, a LED (light emitting diode) light bar. The light emitting element 1031 can be a LED, for example. The light source driving circuit 102 is connected to the light source 103 and the PWM signal generating circuit 101.

The light source driving circuit 102 comprises a light source driving chip 1021, at least one first PWM signal input terminal 1023 and a first control circuit 1022. Specifically, the first control circuit 1022 is connected to the light source 103 (the light emitting element 1031), the light source driving chip 1021 and the first PWM signal input terminal 1023. The light source driving chip 1021 is connected to the light emitting element 1031. The first PWM signal input terminal 1023 is connected to the PWM signal generating circuit 101.

Amongst, the light source driving chip 1021 is utilized for generating the light source driving signals and outputting the light source driving signals to the light source 103. The first PWM signal input terminal 1023 is utilized for receiving at least one first PWM signal from the PWM signal generating circuit 101. The first control circuit 1022 is utilized for receiving the first PWM signal from the first PWM signal input terminal 1023 and controlling the light source 103 to emit light rays according to the first PWM signal.

Amongst, the light source driving chip 1021 is utilized to output the light source driving signals to the light source 103 via the first control circuit 1022.

In the present embodiment, the light source driving chip 1021 is further utilized to receive current detection signals related to the light source 103 and generate the light source driving signals according to the current detection signals, where the current detection signals are signals related to a current passing the light source 103. Specifically, the light source driving circuit 102 further comprises a current detection signal output terminal 1024. The current detection signal output terminal 1024 is connected to the light emitting element 1031 (the light source 103) and the light source driving chip 1021.

In the present embodiment, the light source driving chip 1021 comprises at least one current detection signal input terminal 10211, a main chip, and at least one light source driving signal output terminal 10212. Specifically, the current detection signal output terminal 1024 is connected to the current detection signal input terminal 10211. The light source driving signal output terminal 10212 is connected to the first control circuit 1022.

The current detection signal input terminal 10211 is connected to the light source 103 via the current detection signal output terminal 1024. The current detection signal input terminal 10211 is utilized for receiving the current detection signals from the current detection signal output terminal 1024. The main chip is connected to the current detection signal input terminal 10211 and the light source driving signal output terminal 10212. The main chip is utilized for generating the light source driving signals according to the current detection signals. The light source driving signal output terminal 10212 is connected to the first control circuit 1022. The light source driving signal output terminal 10212 is utilized for outputting the light source driving signals.

In the present embodiment, the first control circuit 1022 comprises at least one first field-effect transistor. The first field-effect transistor comprises a first control terminal 10221, a first input terminal 10222, and a first output terminal 10223.

The first control terminal 10221 is connected to the first PWM signal input terminal 1023. The first control terminal 10221 is utilized for receiving the first PWM signal and controlling a first current channel between the first input terminal 10222 and the first output terminal 10223 to be turned on or turned off according to the first PWM signal.

The first input terminal 10222 is connected to the light source driving signal output terminal 10212. The first input terminal 10222 is utilized for receiving the light source driving signals.

The first output terminal 10223 is connected to the light emitting element 1031 and the current detection signal input terminal 10211. The first output terminal 10223 is utilized for outputting the light source driving signals when the first current channel is turned on.

For example, as shown in FIG. 2, the light source driving chip 1021 comprises N (corresponding to a first predetermined number) current detection signal input terminals 10211 and N light source driving signal output terminals 10212. The first control circuit 1022 comprises N first field-effect transistors. The light source 103 comprises N light emitting elements 1031. The light source driving circuit 102 comprises N current detection signal output terminals 1024. The PWM signal generating circuit 101 comprises N PWM signal output terminals 1011. The N PWM signal output terminals 1011 of the PWM signal generating circuit 101 are connected to the first input terminals 10222 of the N first field-effect transistors respectively via N PWM signal input terminals. The N light source driving signal output terminals 10212 of the light source driving chip 1021 are respectively connected to the first control terminals 10221 of the N first field-effect transistors. The first output terminals 10223 of the N first field-effect transistors are respectively connected to the N light emitting elements 1031 of the light source 103. The N light emitting elements 1031 of the light source 103 are further connected to the N current detection signal input terminals 10211 respectively via the N current detection signal output terminals 1024. In the present embodiment, N is a positive integer. For example, N is eight.

Figure 3:
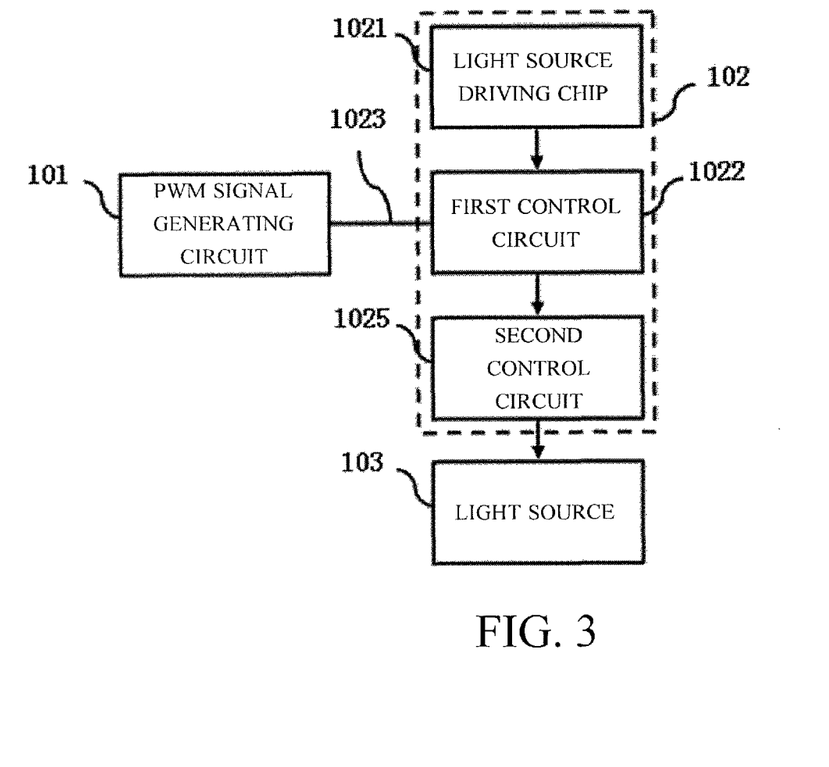
FIG. 3 is a schematic diagram showing a connection relation between a light source driving circuit, a light source, and a PWM signal generating circuit in accordance with a second embodiment of the present invention.
Figure 4:
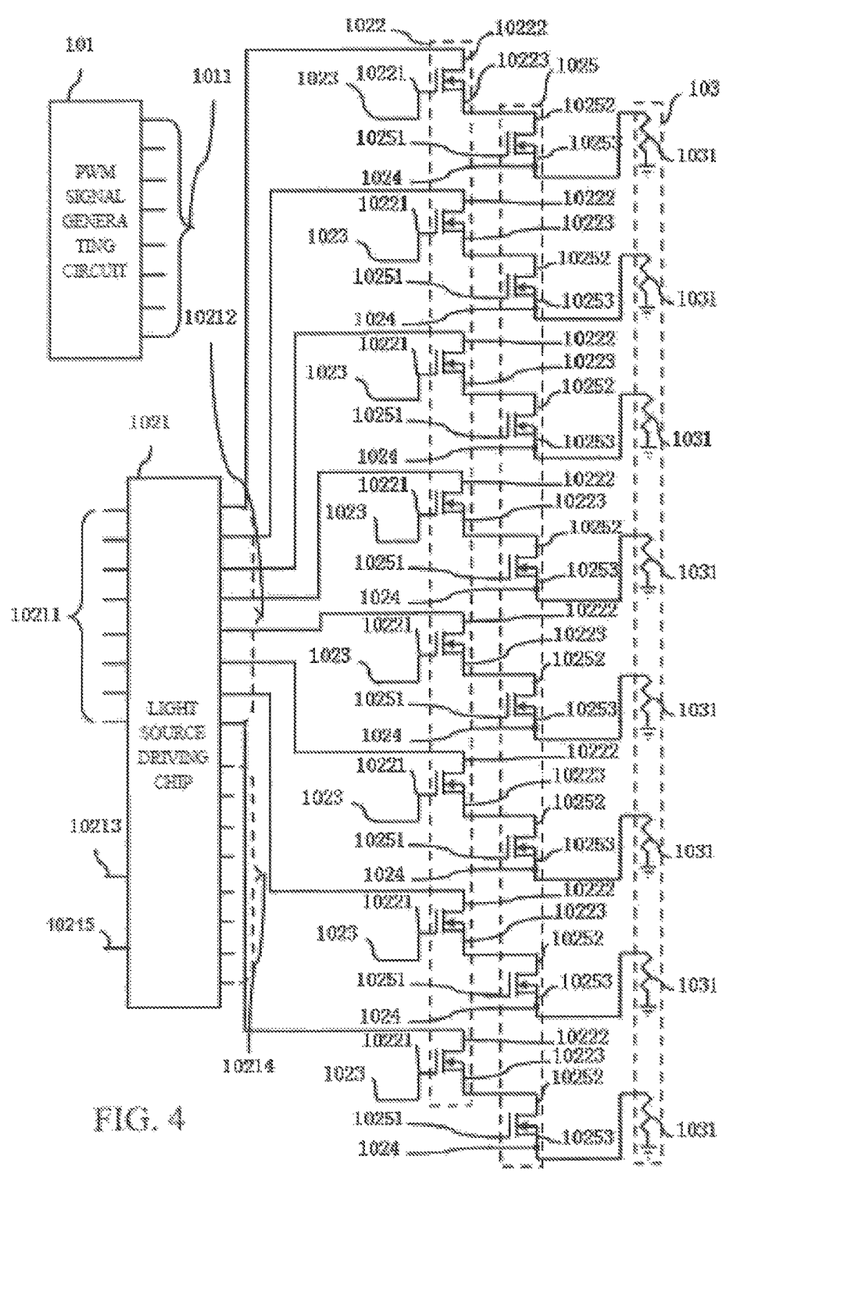
FIG. 4 is a schematic diagram showing a circuit indicating a connection relation between the light source driving circuit, the light source, and the PWM signal generating circuit shown in FIG. 3 in accordance with the second embodiment of the present invention.

Please refer to FIG. 3 and FIG. 4. FIG. 3 is a schematic diagram showing a connection relation between a light source driving circuit 102, a light source 103, and a PWM signal generating circuit 101 in accordance with a second embodiment of the present invention. FIG. 4 is a schematic diagram showing a circuit indicating a connection relation between the light source driving circuit 102, the light source 103, and the PWM signal generating circuit 101 shown in FIG. 3 in accordance with the second embodiment of the present invention.

The present embodiment is similar to the first embodiment, and the differences therebetween are described below.

In the present embodiment, the light source driving chip 1021 further comprises a second PWM signal input terminal 10215 and at least one control signal output terminal 10214.

The second PWM signal input terminal 10215 is utilized for receiving a second PWM signal.

The control signal output terminal 10214 is utilized for outputting at least one control signal, in which the control signal corresponds to the second PWM signal.

The main chip is further utilized to generate the control signal according to the second PWM signal. Specifically, the main chip is further utilized to receive M second PWM signals via a receiving terminal 10213 and generate N control signals according to the M second PWM signals. Amongst, M is a positive integer. For example, M is one and N is eight.

The light source driving circuit 102 further comprises a second control circuit 1025. The second control circuit 1025 is connected to the light source driving chip 1021, the first control circuit 1022, and the light source 103. The second control circuit 1025 is utilized for controlling the light source 103 to emit light rays according to the control signal. Amongst, the first control circuit 1022 is connected to the light source 103 via the second control circuit 1025.

In the present embodiment, the second control circuit 1025 comprises at least one second field-effect transistor. Amongst, the second field-effect transistor comprises a second control terminal 10251, a second input terminal 10252, and a second output terminal 10253.

The second control terminal 10251 is connected to the control signal output terminal 10214. The second control terminal 10251 is utilized for receiving the control signal and controlling a second current channel between the second input terminal 10252 and the second output terminal 10253 to be turned on or turned off according to the control signal. The second input terminal 10252 is connected to the first output terminal 10223. The second input terminal 10252 is utilized for receiving the light source driving signals from the first output terminal 10223. The second output terminal 10253 is connected to the light emitting element 1031 and the current detection signal input terminal 10211. The second output terminal 10253 is utilized for outputting the light source driving signals to the light emitting element 1031 when the second current channel is turned on. The second output terminal 10253 is further connected to the current detection signal output terminal 1024.

The first control circuit 1022 is further utilized to output the light source driving signals to the light source 103 via the second control circuit 1025 when the second current channel is turned on.

For example, as shown in FIG. 4, the light source driving chip 1021 further comprises M (corresponding to a second predetermined number) second PWM signal input terminals and N (corresponding to the first predetermined number) control signal output terminals 10214. The M second PWM signal input terminals are arbitrarily connected to M PWM signal output terminals 1011 of the PWM signal generating circuit 101.

In above-described technical schemes, the light source driving circuit 102 of the present invention can be used flexibly with the light emitting elements 1031 and other electronic components, thereby adapting to an application environment with complicated electronic components.

Figure 5:
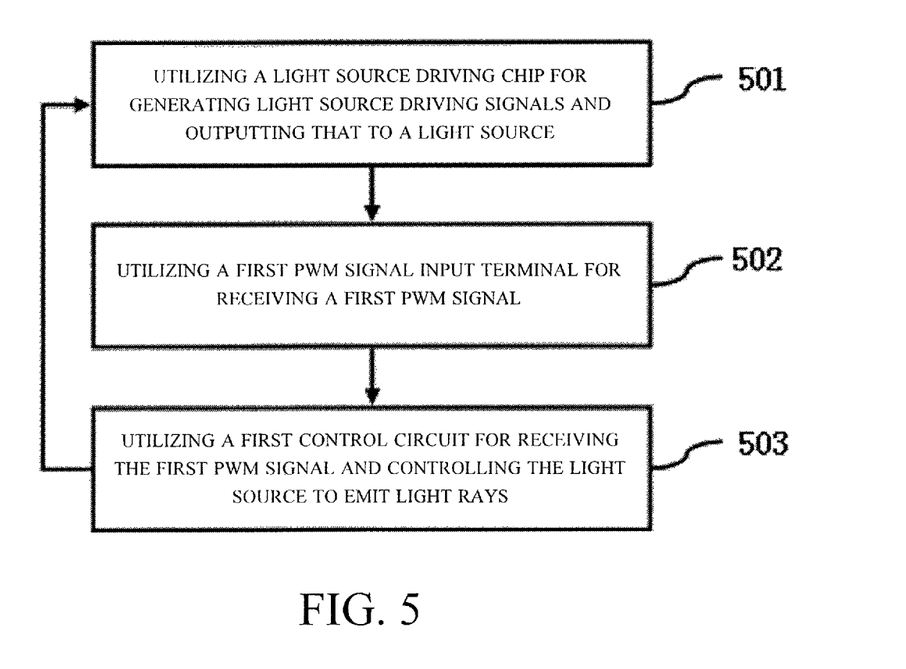
FIG. 5 is a flow chart of a first embodiment of a light source driving method in accordance with the present invention.

Please refer to FIG. 5, which is a flow chart of a first embodiment of a light source driving method in accordance with the present invention.

The light source driving method of the present invention comprises the following steps:

utilizing a light source driving chip 1021 for generating light source driving signals and outputting the light source driving signals to a light source 103;

utilizing a first pulse width modulation (PWM) signal input terminal 1023 for receiving at least one first PWM signal; and utilizing a first control circuit 1022 for receiving the first PWM signal from the first PWM signal input terminal 1023 and controlling the light source 103 to emit light rays according to the first PWM signal.

In the present embodiment, the step of utilizing the light source driving chip 1021 for generating the light source driving signals and outputting the light source driving signals to the light source 103 comprise:

utilizing the light source driving chip 1021 to receive current detection signals related to the light source 103 and generate the light source driving signals according to the current detection signals.

Amongst, the current detection signals are signals related to a current passing the light source 103.

Figure 6:
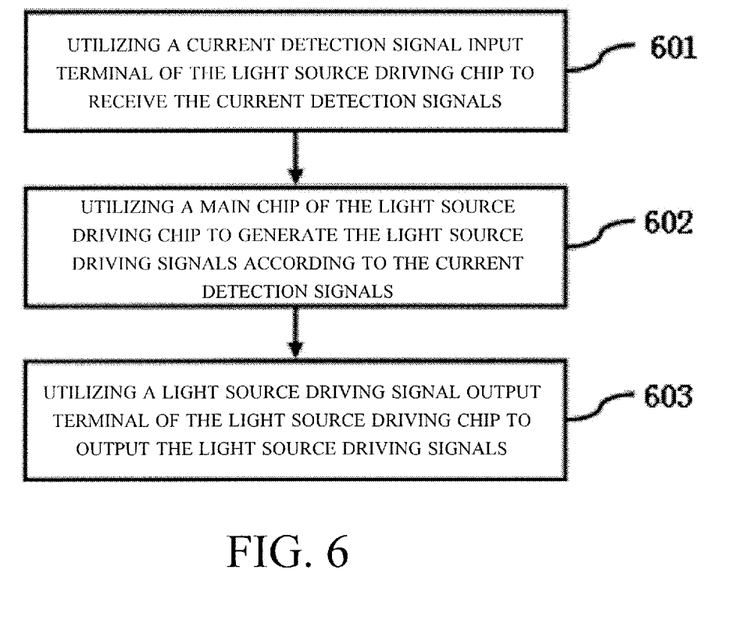
FIG. 6 is a flow char of the step of utilizing a light source driving chip for generating light source driving signals and outputting the light source driving signals to a light source in FIG. 5.

Please refer to FIG. 6, which is a flow char of the step of utilizing the light source driving chip 1021 for generating the light source driving signals and outputting the light source driving signals to the light source 103 in FIG. 5.

Amongst, the step of utilizing the light source driving chip 1021 to receive the current detection signals related to the light source 103 and generate the light source driving signals according to the current detection signals comprises:

utilizing a current detection signal input terminal 10211 of the light source driving chip 1021 to receive the current detection signals, in which the current detection signal input terminal 10211 is connected to the light source 103;

utilizing a main chip of the light source driving chip 1021 to generate the light source driving signals according to the current detection signals, in which the main chip is connected to the current detection signal input terminal 10211 and a light source driving signal output terminal 10212; and utilizing the light source driving signal output terminal 10212 of the light source driving chip 1021 to output the light source driving signals, in which the light source driving signal output terminal 10212 is connected to the first control circuit 1022.

Figure 7:
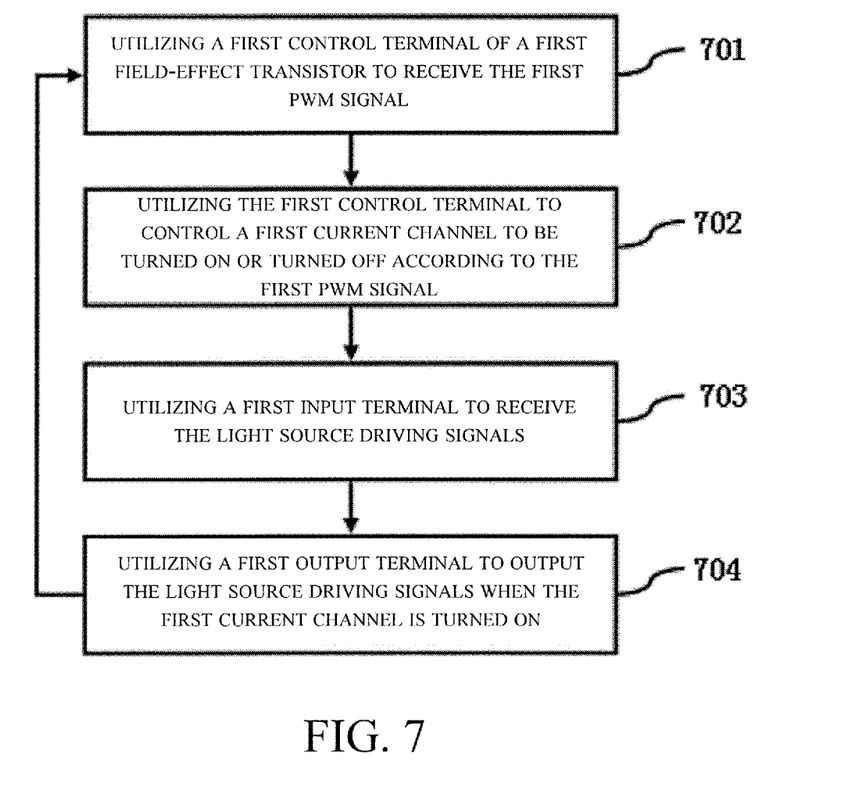
FIG. 7 is a flow chart of the step of utilizing a first control circuit for receiving a first PWM signal and controlling a light source to emit light rays according to the first PWM signal in FIG. 5.

Please refer to FIG. 7, which is a flow chart of the step of utilizing the first control circuit 1022 for receiving the first PWM signal and controlling the light source 103 to emit light rays according to the first PWM signal in FIG. 5.

Amongst, the step of utilizing the first control circuit 1022 for receiving the first PWM signal from the first PWM signal input terminal 1023 and controlling the light source 103 to emit light rays according to the first PWM signal comprises:

utilizing a first control terminal 10221 of a first field-effect transistor of the first control circuit 1022 to receive the first PWM signal and control a first current channel between a first input terminal 10222 and a first output terminal 10223 to be turned on or turned off according to the first PWM signal, in which the first control terminal 10221 is connected to the first PWM signal input terminal 1023;

utilizing the first input terminal 10222 of the first field-effect transistor of the first control circuit 1022 to receive the light source driving signals, in which the first input terminal 10222 is connected to the light source driving signal output terminal 10212; and utilizing the first output terminal 10223 of the first field-effect transistor of the first control circuit 1022 to output the light source driving signals when the first current channel is turned on, in which the first output terminal 10223 is connected to the light emitting element 1031 and the current detection signal input terminal 10211.

Figure 8:
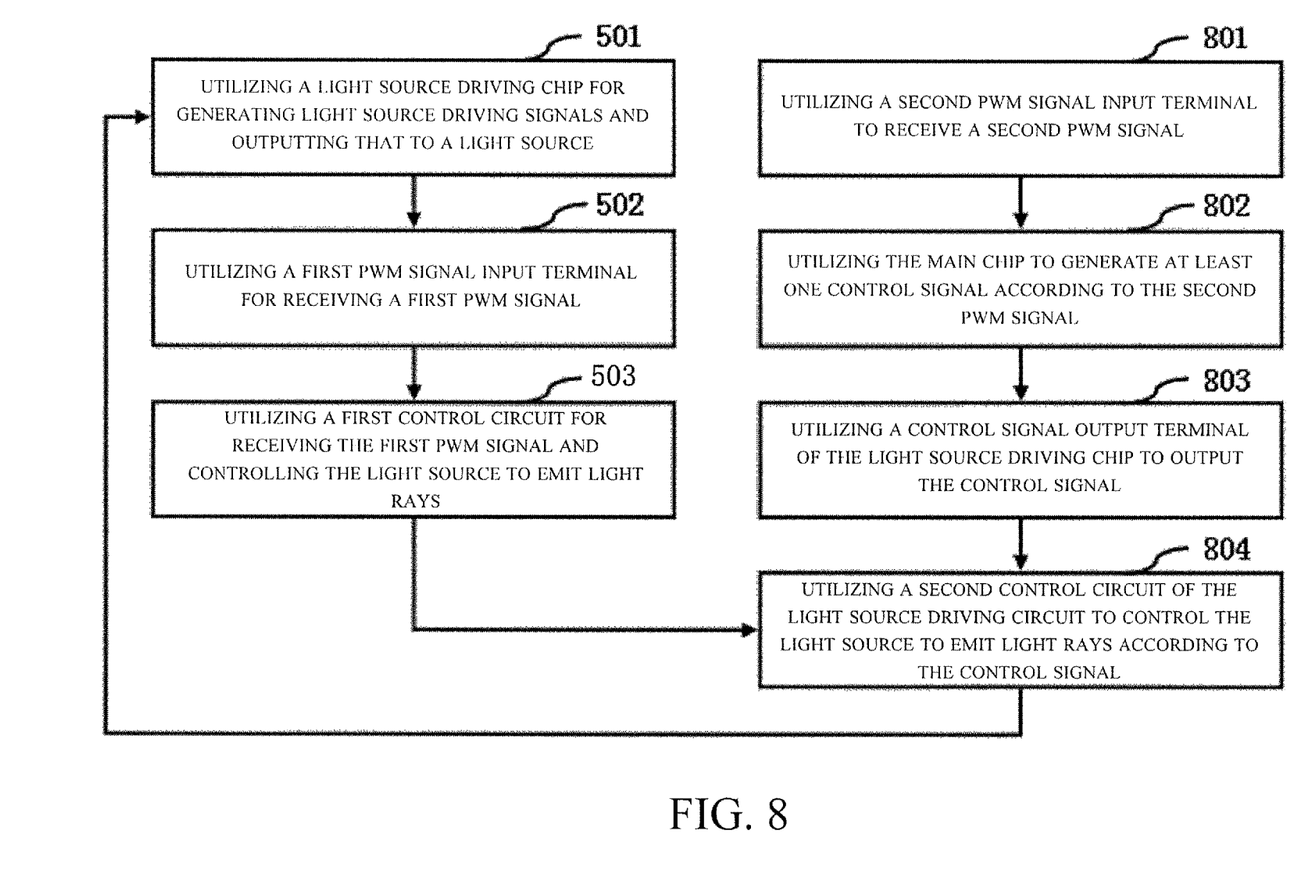
FIG. 8 is a flow chart of a second embodiment of a light source driving method in accordance with the present invention.

Please refer to FIG. 8, which is a flow chart of a second embodiment of a light source driving method in accordance with the present invention.

The present embodiment is similar to the afore-described first embodiment. The differences therebetween are that in the present embodiment, said method further comprises the following steps:

utilizing a second PWM signal input terminal of the light source driving chip 1021 to receive a second PWM signal;

utilizing the main chip of the light source driving chip 1021 to generate at least one control signal according to the second PWM signal;

utilizing a control signal output terminal 10214 of the light source driving chip 1021 to output the control signal, in which the control signal corresponds to the second PWM signal; and utilizing a second control circuit 1025 of the light source driving circuit 102 to control the light source 103 to emit light rays according to the control signal, in which the second control circuit 1025 is connected to the light source driving chip 1021, the first control circuit 1022 and the light source 103, and the first control circuit 1022 is connected to the light source 103 via the second control circuit 1025.

Figure 9:
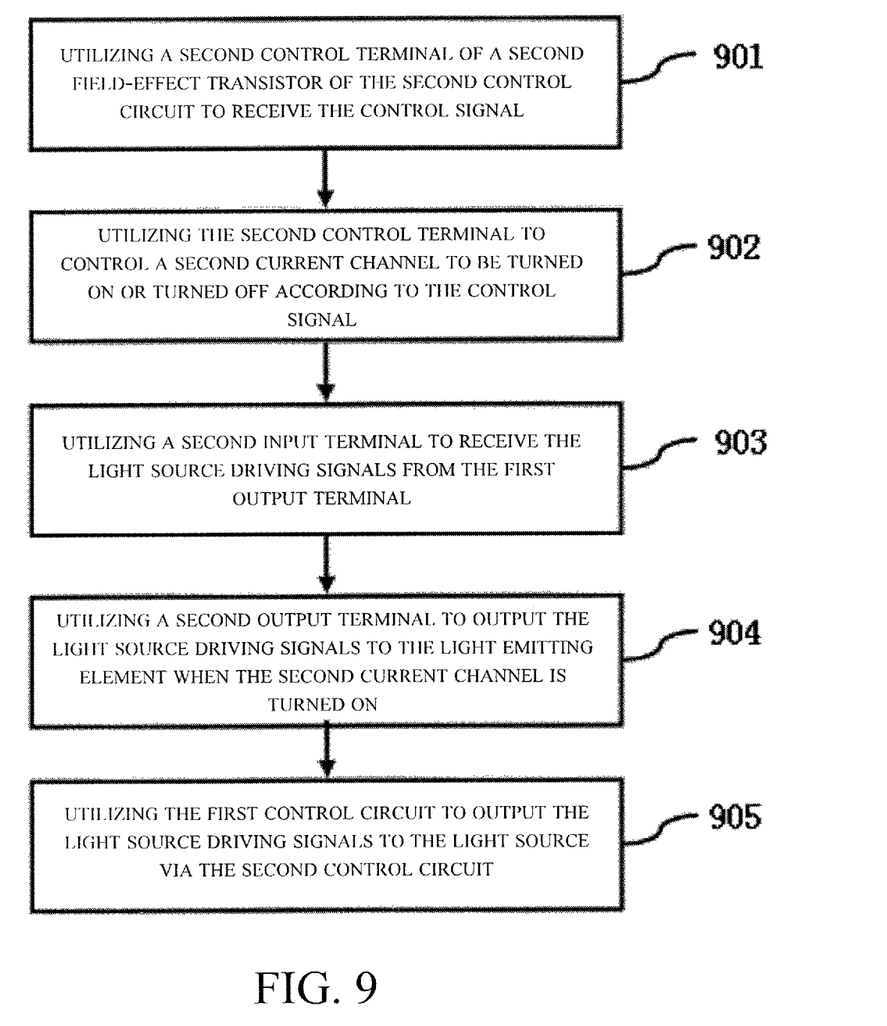
FIG. 9 is a flow chart of the step of utilizing a second control circuit to control a light source to emit light rays according to a control signal in FIG. 8.

Please refer to FIG. 9, which is a flow chart of the step of utilizing the second control circuit 1025 to control the light source 103 to emit light rays according to the control signal in FIG. 8.

Amongst, the step of utilizing the second control circuit 1025 of the light source driving circuit 102 to control the light source 103 to emit light rays according to the control signal comprises:

utilizing a second control terminal 10251 of a second field-effect transistor of the second control circuit 1025 to receive the control signal and control a second current channel between a second input terminal 10252 and a second output terminal 10253 to be turned on or turned off according to the control signal, in which the second control terminal 10251 is connected to the control signal output terminal 10214;

utilizing the second input terminal 10252 of the second field-effect transistor of the second control circuit 1025 to receive the light source driving signals from the first output terminal 10223, in which the second input terminal 10252 is connected to the first output terminal 10223;

utilizing the second output terminal 10253 of the second field-effect transistor of the second control circuit 1025 to output the light source driving signals to the light emitting element 1031 when the second current channel is turned on, in which the second output terminal 10253 is connected to the light emitting element 1031 and the current detection signal input terminal 10211; and utilizing the first control circuit 1022 to output the light source driving signals to the light source 103 via the second control circuit 1025 when the second current channel is turned on.

In above-described technical schemes, the light source driving method of the present invention can be used flexibly with the light emitting elements 1031 and other electronic components, thereby adapting to an application environment with complicated electronic components.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A light source driving circuit for providing light source driving signals to a light source, in which the light source comprises at least one light emitting element, said light source driving circuit comprising:
    a light source driving chip for generating the light source driving signals and outputting the light source driving signals to the light source;
    at least one first pulse width modulation (PWM) signal input terminal for receiving at least one first PWM signal; and
    a first control circuit connected to the light source, the light source driving chip, and the first PWM signal input terminal, for receiving the first PWM signal from the first PWM signal input terminal and controlling the light source to emit light rays according to the first PWM signal;
    wherein the light source driving chip is utilized to output the light source driving signals to the light source via the first control circuit; and
    wherein the light source driving chip is further utilized to receive current detection signals related to the light source and generate the light source driving signals according to the current detection signals, where the current detection signals are signals related to a current passing the light source;
    the light source driving chip comprising:
    at least one current detection signal input terminal connected to the light source, for receiving the current detection signals;
    a main chip for generating the light source driving signals according to the current detection signals; and
    at least one light source driving signal output terminal connected to the first control circuit, for outputting the light source driving signals;
    wherein the first control circuit comprises at least one first field-effect transistor, which comprises:
    a first control terminal connected to the first PWM signal input terminal, for receiving the first PWM signal and controlling a first current channel between a first input terminal and a first output terminal to be turned on or turned off according to the first PWM signal;
    the first input terminal connected to the light source driving signal output terminal, for receiving the light source driving signals; and
    the first output terminal connected to the light emitting element and the current detection signal input terminal, for outputting the light source driving signals when the first current channel is turned on;
    wherein the light source driving chip further comprises:
    a second PWM signal input terminal for receiving a second PWM signal; and
    at least one control signal output terminal for outputting at least one control signal, wherein the control signal corresponds to the second PWM signal;
    the main chip being further utilized to generate the control signal according to the second PWM signal; and
    the light source driving circuit further comprising:
    a second control circuit connected to the light source driving chip, the first control circuit and the light source, for controlling the light source to emit light rays according to the control signal;
    wherein the first control circuit is connected to the light source via the second control circuit.

2. A light source driving circuit for providing light source driving signals to a light source, in which the light source comprises at least one light emitting element, said light source driving circuit comprising:
    a light source driving chip for generating the light source driving signals and outputting the light source driving signals to the light source;
    at least one first pulse width modulation (PWM) signal input terminal for receiving at least one first PWM signal; and
    a first control circuit connected to the light source, the light source driving chip, and the first PWM signal input terminal, for receiving the first PWM signal from the first PWM signal input terminal and controlling the light source to emit light rays according to the first PWM signal;
    wherein the light source driving chip is utilized to output the light source driving signals to the light source via the first control circuit;
    wherein the light source driving chip comprises:
    at least one current detection signal input terminal connected to the light source, for receiving the current detection signals;
    a main chip for generating the light source driving signals according to the current detection signals; and
    at least one light source driving signal output terminal connected to the first control circuit, for outputting the light source driving signals;
    wherein the first control circuit comprises at least one first field-effect transistor, which comprises:
    a first control terminal connected to the first PWM signal input terminal for receiving the first PWM signal and controlling a first current channel between a first input terminal and a first output terminal to be turned on or turned off according to the first PWM signal;
    the first input terminal connected to the light source driving signal output terminal, for receiving the light source driving signals; and
    the first output terminal connected to the light emitting element and the current detection signal input terminal, for outputting the light source driving signals when the first current channel is turned on;
    wherein the light source driving chip further comprises:
    a second PWM signal input terminal for receiving a second PWM signal; and
    at least one control signal output terminal for outputting at least one control signal in which the control signal corresponds to the second PWM signal;
    the main chip being further utilized to generate the control signal according to the second PWM signal;
    the light source driving circuit further comprising:
    a second control circuit connected to the light Source driving chip, the first control circuit, and the light source, for controlling the light source to emit light rays according to the control signal; and
    wherein the first control circuit is connected to the light source via the second control circuit.

3. The light source driving circuit according to claim 2, wherein the light source driving chip is further utilized to receive current detection signals related to the light source and generate the light source driving signals according to the current detection signals, where the current detection signals are signals related to a current passing the light source.

4. The light source driving circuit according to claim 2, wherein the second control circuit comprises at least one second field-effect transistor, which comprises:
   a second control terminal connected to the control signal output terminal, for receiving the control signal and controlling a second current channel between a second input terminal and a second output terminal to be turned on or turned off according to the control signal;
   the second input terminal connected to the first output terminal, for receiving the light source driving signals from the first output terminal; and
   the second output terminal connected to the light emitting element and the current detection signal input terminal, for outputting the light source driving signals to the light emitting element when the second current channel is turned on;
   the first control circuit being further utilized to output the light source driving signals to the light source via the second control circuit when the second current channel is turned on.

5. The light source driving circuit according to claim 2, wherein the light source driving chip comprises a first predetermined number of the current detection signal input terminals and the first predetermined number of the light source driving signal output terminals.

6. The light source driving circuit according to claim 5, wherein:
   the light source driving circuit is connected to a PWM signal generating circuit; and
   the light source driving chip comprises a second predetermined number of the second PWM signal input terminals and the first predetermined number of the control signal output terminals, and the second predetermined number of the second PWM signal input terminals are arbitrarily connected to the second predetermined number of PWM signal output terminals of the PWM signal generating circuit.

7. The light source driving circuit according to claim 6, wherein the main chip is further utilized to receive the second predetermined number of the second PWM signals via a receiving terminal and generate the first predetermined number of the control signals according to the second predetermined number of the second PWM signals.

8. The light source driving circuit according to claim 7, wherein the first predetermined number is eight and the second predetermined number is one.

9. A light source driving method, comprising steps of:
   utilizing a light source driving chip for generating light source driving signals and outputting the light source driving signals to a light source;
   utilizing a first pulse width modulation (PWM) signal input terminal for receiving at least one first PWM signal; and
   utilizing a first control circuit for receiving the first PWM signal from the first PWM signal input terminal and controlling the light source to emit light rays according to the first PWM signal;
   wherein the step of generating the light source driving signals by utilizing the light source driving chip and outputting the light source driving signals to the light source comprises:
   utilizing a current detection signal input terminal of the light source driving chip to receive the current detection signals, in which the current detection signal input terminal is connected to the light source;
   utilizing a main chip of the light source driving chip to generate the light source driving signals according to the current detection signals; and
   utilizing a light source driving signal output terminal of the light source driving chip to output the light source driving signals, in which the light source driving signal output terminal is connected to the first control circuit,
   wherein the step of utilizing the first control circuit for receiving the first PWM signal from the first PWM signal input terminal and controlling the light source to emit light rays according to the first PWM signal comprises;
   utilizing a first control terminal of a first field-effect transistor of the first control circuit to receive the first PWM signal and control a first current channel between a first input terminal and a first output terminal to be turned on or turned off according to the first PWM signal, in which the first control terminal is connected to the first PWM signal input terminal;
   utilizing the first input terminal of the first field-effect transistor of the first control circuit to receive the light source driving signals, in which the first input terminal is connected to the light source driving signal output terminal; and
   utilizing the first output terminal of the first field-effect transistor of the first control circuit to output the light source driving signals when the first current channel is turned on, in which the first output terminal is connected to the light emitting element and the current detection signal input terminal;
   wherein the light source driving method further comprises steps of:
   utilizing a second PWM signal input terminal of the light source driving chip to receive a second PWM signal;
   utilizing the main chip of the light source driving chip to generate at least one control signal according to the second PWM signal;
   utilizing a control signal output terminal of the light source driving chip to output the control signal, in which the control signal corresponds to the second PWM signal; and
   utilizing a second control circuit of the light source driving circuit to control the light source to emit light rays according to the control signal in which the second control circuit is connected to the light source driving chip, the first control circuit and the light source, and the first control circuit is connected to the light source via the second control circuit.

10. The light source driving method according to claim 9, wherein the step of generating the light source driving signals by utilizing the light source driving chip comprises:
    utilizing the light source driving chip to receive current detection signals related to the light source and generate the light source driving signals according to the current detection signals, where the current detection signals are signals related to a current passing the light source.

11. The light source driving method according to claim 9, wherein the step of utilizing the second control circuit of the light source driving circuit to control the light source to emit light rays according to the control signal comprises:
    utilizing a second control terminal of a second field-effect transistor of the second control circuit to receive the control signal and control a second current channel between a second input terminal and a second output terminal to be turned on or turned off according to the control signal, in which the second control terminal is connected to the control signal output terminal;

utilizing the second input terminal of the second field-effect transistor of the second control circuit to receive the light source driving signals from the first output terminal, in which the second input terminal is connected to the first output terminal;

utilizing the second output terminal of the second field-effect transistor of the second control circuit to output the light source driving signals to the light emitting element when the second current channel is turned on, in which the second output terminal is connected to the light emitting element and the current detection signal input terminal; and utilizing the first control circuit to output the light source driving signals to the light source via the second control circuit when the second current channel is turned on.

12. The light source driving method according to claim 11, wherein the step of utilizing the main chip of the light source driving chip to generate the at least one control signal according to the second PWM signal comprises:

utilizing the main chip to receive a second predetermined number of the second PWM signals via a receiving terminal and generate a first predetermined number of the control signals according to the second predetermined number of the second PWM signals.

* * * * *